Figure 1:
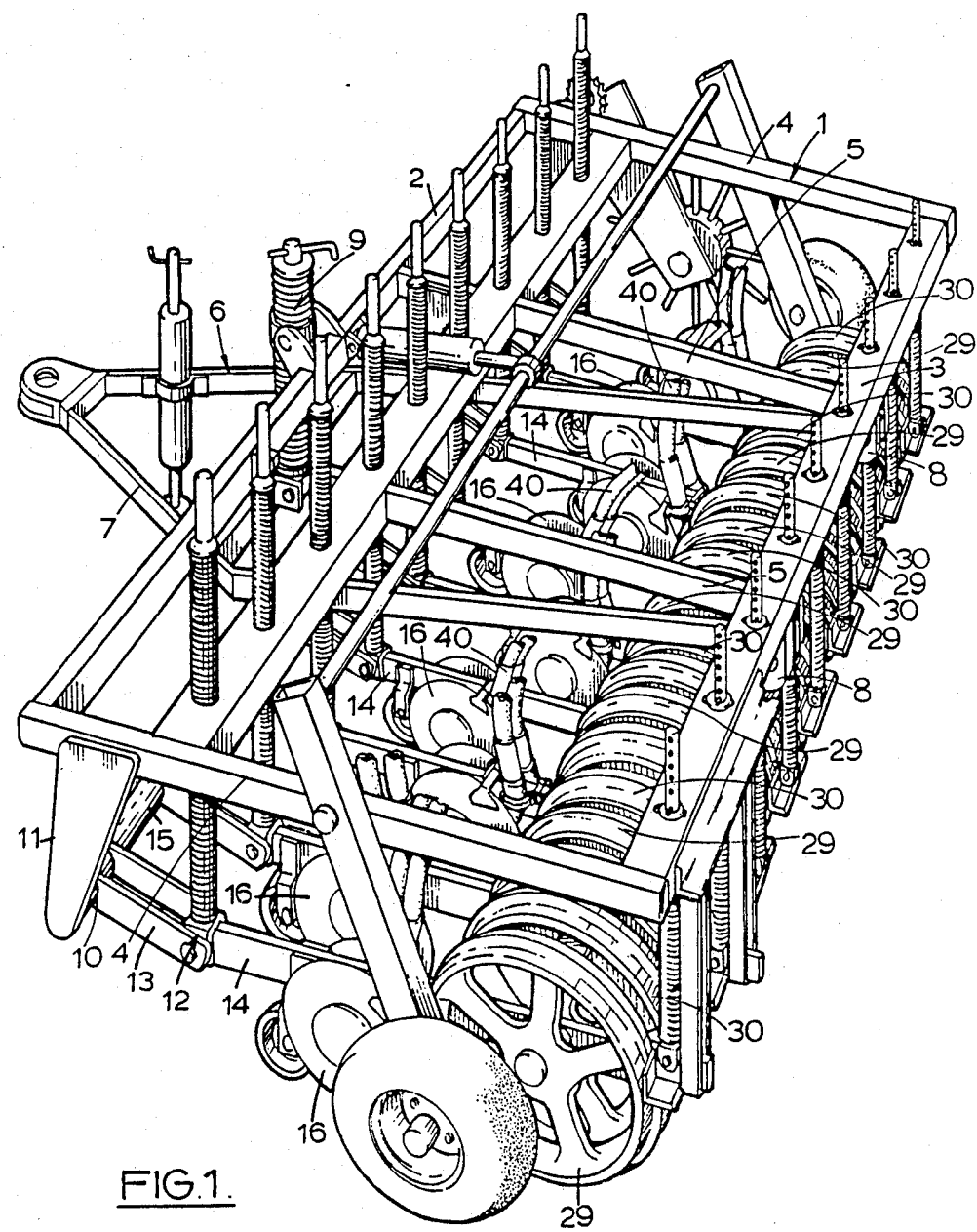

United States Patent [19]

Moore

[11] Patent Number: 4,825,783

[45] Date of Patent: May 2, 1989

[54] METHOD AND MEANS FOR AGRICULTURAL SEEDING

[76] Inventor: Samuel Moore, Newhill House, 33 Kirk Road, Ballymoney BT55 6PP, Co. Antrim, Northern Ireland

[21] Appl. No.: 66,865

[22] Filed: Jun. 25, 1987

[30] Foreign Application Priority Data

Jun. 28, 1986 [GB]  United Kingdom ................. 8615855

[51] Int. Cl.$^4$ .............................................. A01C 5/06
[52] U.S. Cl. ...................................... 111/165; 111/81
[58] Field of Search ....................... 111/85, 81, 86–88, 111/83, 52; 172/574, 500, 551, 691, 693, 688, 696, 689, 624

[56] References Cited

U.S. PATENT DOCUMENTS

| | | | |
|---|---|---|---|
| 345,403 | 7/1886 | Arnett | 111/88 |
| 799,676 | 9/1905 | Roby | 111/87 |
| 845,660 | 2/1907 | Ogletree | 172/688 X |
| 1,061,596 | 5/1913 | Burns | 111/87 |
| 1,172,046 | 2/1916 | Psencik | 172/574 |
| 1,330,451 | 2/1920 | Salmon | 111/87 |
| 1,430,483 | 9/1922 | Wolverton | 172/688 X |
| 2,075,475 | 3/1937 | Seright | 172/693 X |
| 2,869,489 | 1/1959 | Buhr | 111/86 X |
| 3,611,956 | 10/1971 | Moore | 111/87 X |
| 3,749,035 | 7/1973 | Cayton | 111/85 |

FOREIGN PATENT DOCUMENTS

| | | | |
|---|---|---|---|
| 176969 | 11/1906 | Fed. Rep. of Germany | 172/574 |
| 10831 | 9/1895 | Switzerland | 172/688 |
| 25773 | of 1912 | United Kingdom | 111/87 |

*Primary Examiner*—Robert A. Hafer
*Assistant Examiner*—Danton D. DeMille
*Attorney, Agent, or Firm*—Oldham & Oldham Co.

[57] ABSTRACT

In seeding apparatus a plurality of discs for cutting slits in the ground are carried by arm assemblies which are spaced transversely across the apparatus. The arm assemblies are rigidly connected together in pairs to form separate units, and each arm assembly comprises an arm which is cranked at an intermediate point in its length with each arm carrying a pair of discs which are staggered longitudinally and transversely, being journalled for rotation on inner and outer arm portions on opposite sides of the crank. A pair of ground compacting rollers carried by the unit and journalled for rotation about axles normal to the longitudinal axis of the unit are each adapted to close slits cut in the ground by the two discs carried by each respective arm.

6 Claims, 2 Drawing Sheets

METHOD AND MEANS FOR AGRICULTURAL SEEDING

This invention relates to agricultural sowing of seeds by the technique of slit sowing in which seeds are implanted in slits or narrow slots cut in the ground, not necessarily cultivated or otherwise prepared except, in suitable cases, where vegetation is killed by the application of suitable chemicals. Essentially our invention is concerned with apparatus for preparing and seeding ground in which seeds from a seedbox mounted on a frame assembly for connection to a towing vehicle are delivered through tubes to slits which are cut and opened in the ground by a plurality of discs mounted on the frame assembly for rotation about generally transverse axes, and at least one roller mounted on the frame assembly rearwardly of the discs for rotation about a transverse axis is adapted to compact the ground and close the slits after seeds have been implanted therein.

In my U.S. Pat. No. 3,611,956 I have disclosed apparatus of the kind set forth in which the frame assembly comprises first and second relatively movable frames of which the first frame comprises a draw bar for connection to a towing vehicle and the second forms a mounting for a plurality of spaced substantially parallel longitudinally extending arm assemblies carrying the discs, the arm assemblies being located below the frames and being urged downwardly away from the second frame by resilient means and a resilient connection is provided between the second frame and the draw bar by adjustment of which the loading on the apparatus applied to the discs can be varied to control penetration of the disc into the ground and the depth of the slits thus produced.

In the construction described in U.S. Pat. No. 3,611,956 each arm assembly includes a straight arm which carries a pair of disvcs and a pair of ground compacting rollers, and the discs on adjacent arm assemblies may be staggered longitudinally whereby the discs on alternate assemblies are aligned transversely. This has the advantage that the apparatus can accommodate a maximum number of discs within the width of the second frame, and the adjacent discs are spaced from each other in close proximity compatible with a desired spacing of the slits and rows of seeds.

According to my present invention in apparatus of the kind set forth in which the frame assembly comprises first and second relatively movable frames of which the first frame comprises a draw bar for connection to a towing vehicle and the second forms a mounting for a plurality of spaced substantially parallel longitudinally extending arm assemblies carrying the discs, the arm assemblies being located below the frames and being urged downwardly away from the second frame by resilient means and a resilient connection is provided between the second frame and the draw bar by adjustment of which the loading on the apparatus applied to the discs can be varied to control penetration of the discs into the ground and the depth of the slits thus produced, each arm assembly comprises an arm which is cranked at an intermediate point in its length and carries a pair of discs which are staggered both longitudinally and transversely, being journalled for rotation on inner and outer arm portions on opposite sides of the crank.

This reduces the axial spacing between the discs of each pair thereby enabling the pitch of slits cut by the apparatus in use to be reduced. In fact the spacing can be reduced such that four rows can be seeded in a given strip where two rows only where possible with the apparaus of my U.S. Pat. No. 3,611,956.

This is of particular advantage since the apparatus can now be used with advantage in renewing grass on sports fields, golf courses, parks, amenity lands, and the like.

By reducing the axis spacing between pairs of discs I can now arrange for a single ground compacting roller to close an adjacent pair of slits. Preferably the arms are rigidly connected together in pairs, and each pair carries a pair of ground compacting rollers, each for closing slits cut by the two discs on the respective arm of that pair.

Figure 2:
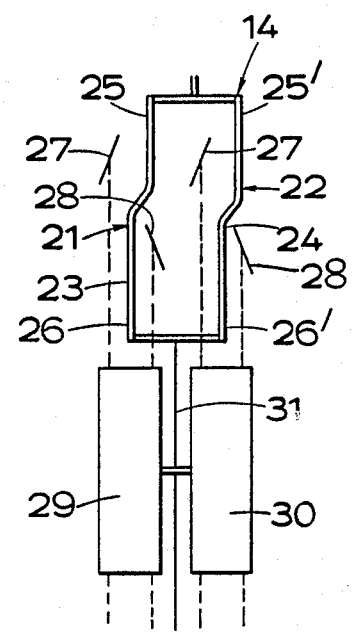

One embodiment of our invention is illustrated in the accompanying drawings in which:

FIG. 1 is a perspective view of apparatus for preparing and seeding ground with a seed box and fertilizer box omitted for clarity; and FIG. 2 is a plan view of a pair of arm assemblies incorporated in the apparatus of FIG. 1.

In the following description directional references are made in relation to the direction of travel.

The apparatus illustrated in the drawings comprises a first frame 1 of rectangular outline which is oblong in a transverse direction and which comprises spaced parallel front and rear members 2 and 3 which are interconnected by longitudinally extending side members 4 and intermediate longitudinal bracing members 5. A second frame 6 in the form of a draw-bar 7 of substantially wishbone outline is pivotally connected at the free ends of its limbs to a pair of spaced brackets 8 which depend downwardly from the rear member 3. The front member 2 is connected to the frame 6 by means of a spring-loaded strut assembly 9, which is adjustable normally to alter the relative angular positions of the frames 1 and 6.

A transverse shaft 10 is journalled in a plurality of transversely spaced brackets 11 which depend downwardly from the side members 4 and the bracing members 5 adjacent to the front member 2. A plurality of spaced longitudinal arm assemblies 12, each comprising a pair of members 13 and 14 pivotally connected at adjacent ends, are journalled at their forward ends on the shaft 10. Adjacent arm assemblies 12 are spaced from each other by distance pieces 15 carried by the shaft 10.

Each member 14 comprises a pair of arm assemblies 21, 22 each comprising a pair of arms 23, 24 which are cranked at intermediate points in their lengths to provide pairs of forward and rearward arm portions 25, 25', 26, 26'. The arms are cranked in corresponding directions so that the spacings between the arm portions 25, 25' and the arm portions 26, 26' are substantially equal.

A pair of cutting discs 27, 28 are journalled for rotation on opposite sides of each arm 23, 24 with one of said discs journalled for rotation on the left side of the forward portions 25, 25' and the other of said discs journalled on the right side of the rearward portions 26, 26'. This reduces the spacing between the discs 27, 28 by an amount determined by the displacement of the two portions 25 and 26 due to the crank.

The arms 23, 24 are rigidly connected at their forward and rearward ends to form a rigid unit, and a pair of ground compacting rollers 29, 30 are journalled for rotation on opposite sides of a rearwardly extending mounting member 31. Each roller 29, 30 is arranged rearwardly of the two discs carried by the respective arm 23, 24 to pass over and close the slits cut in the ground by a corresponding pair of discs 27, 28 carried by each respective arm 23, 24.

Seeds are conveyed to slits cut by the discs 27, 28 by means of seed tubes 40 of which one tube is provided for each disc 27, 28, and the slits are then closed by the rollers 29, 30.

Figure 3:
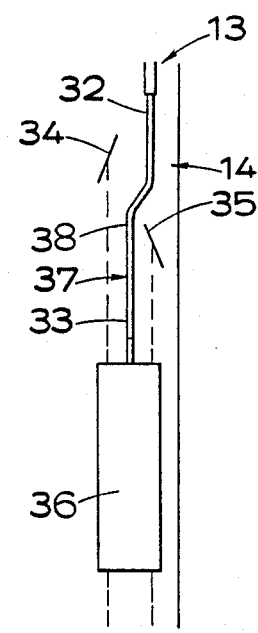

In a further embodiment shown in FIG. 3 each member of the assembly 14 comprises an arm assembly 37. The arm assembly 37 comprises an arm 38 which is cranked at an intermediate point in its length to provide a forward portion 32 and a rearward portion 33.

A pair of cutting discs 34,35, are journalled for rotation on opposite sides of the arm 32 with one of said discs located on the left side of the forward portion and the other said disc located on the right hand side of the rearward portion.

I claim:

1. Apparatus for preparing and seeding ground comprising a frame assembly for connection to a towing vehicle, a plurality of discs mounted on the frame assembly for rotation about generally transverse axes for cutting and opening slits in the ground, seed tubes are provided fro each disc through which seeds are delivered to said slits, at least one roller mounted on said frame assembly in a position rearwardly of said discs for rotation about a transverse axis for closing said slits after seeds have been implanted therein; wherein said frame assembly comprises first and second relatively movable frames of which said first frame comprises a draw bar for connection to said towing vehicle, a plurality of spaced substantially parallel longitudinal extending arm assemblies located below said frames, said arm assemblies being mounted on said second frame and carrying said discs, resilient means for urging said arm assemblies downwardly and away from said second frame, and an adjustable resilient connection between said second frame and said draw bar by adjustment of which the loading on the apparatus applied to said discs can be varied to control penetration of said discs into said ground and the depth of said slits produced, wherein each said arm assembly comprises an arm which has a crank at an intermediate point in the length thereof to define forward and rearward arm portions on opposite sides of said crank, said forward and rearward arm portions are parallel and relative offset transverse to the direction of travel said forward arm portion being parallel to and spaced from the forward arm portion of an adjacent arm assembly by a first distance, and said rearward arm portion being parallel to and spaced from the rearward arm portion of the said adjacent arm assembly by a second distance, said second distance being substantially equal to said first distance, said forward arm portion having a first inner side and a first outer side forward of said crank, and said rearward arm portion having a second inner side contiguous with said first inner side and a second outer side contiguous with said first outer side rearward of said crank, said arm carrying a pair of first and second discs which are relatively staggered both longitudinally and transversely , first means journalling said first disc for rotation on said forward first inner side and second means journalling said second disc for rotation on said rearward second outer side, said first disc being spaced from said second disc on said adjacent arm assembly in a transverse direction by a third distance, said third distance being substantially less than said first distance or said second distance and wherein no part of said first disc is in longitudinal alignment with said second disc on said arm assembly or on said adjacent assembly.

2. Apparatus as claimed in claim 1, wherein a single ground compacting roller of a width greater than the transverse spacing between said discs of said arm is adapted to close slits cut by the discs.

3. Apparatus as claimed in claim 1, wherein said arms are rigidly connected together in pairs to form a rigid unit, and a pair of ground compacting rollers are carried by said unit each of said rollers being adapted to close slits cut the said two discs on the respective one of the said arms of the unit.

4. Apparatus as claimed in claim 3, wherein said arms are rigidly connected together at opposite ends, and said ground compacting rollers are journalled for rotation on opposite sides of a mounting member which extends rearwardly from the unit.

5. An arm unit for apparatus for preparing and seeding round comprising a pair of first and second similar arms, each said arm having a crank at an intermediate point in the length thereof to define forward and rearward arm portions which are parallel and relatively offset transversely on opposite sides of said crank, and means rigidly connecting said first and second arms together in a spaced relationship such that both said forward and said rearward pairs of arm portions are disposed in substantially parallel relationships, said forward arm portion of said first arm being parallel to and spaced apart from said forward arm portion of said second arm by a first distance and said rarward arm portion of said first arm being parallel to and spaced apart from said rearward arm portion of said second arm by a second distance, said second distance being substantially equal to said first distance, said forward arm portions each having a first inner side and a first outer side and said rearward portions each having a second inner side contiguous with said first inner side on said respective arm and a second outer side contiguous with said first outer side on said respective arm wherein a disc for rotation about a generally transverse axis for cutting and opening a slit in the ground is journalled for rotation on each of said forward and rearward arm portions, each of said arms carrying a pair of first and second discs which are relatively staggered both longitudinally and transversely, a first means journalling said first disc for rotation on said first inner side of each said arm and a second means journalling said second disc for rotation on said second outer side of each said arm, said first disc on each of said arm being spaced from said second disc on each of arm respectively in a transverse direction by a third distance, said third distance being substantially less than said first distance being substantially less wherein no part of said first disc is in longitudinal alignment with said second disc on said first arm or on said second arm, seed tubes are provided for each disc through which seeds are delivered to the furrow made thereby. and a pair of ground compacting rollers carried by said unit are journalled for rotation about axes normal to the main longitudinal, in use each said roller being adapted to close slits cut in the ground by the said two discs carried by each respective arm.

6. A unit as claimed in claim 5, wherein said rollers are journalled for rotation on a mounting member which extends rearwardly from said unit.

* * * * *